United States Patent [19]

Dymond

[11] Patent Number: 4,819,545
[45] Date of Patent: Apr. 11, 1989

[54] POWER STEERING SYSTEM

[75] Inventor: Richard W. Dymond, Rochester, Mich.

[73] Assignee: TRW Inc., Lyndhurst, Ohio

[21] Appl. No.: 78,840

[22] Filed: Jul. 28, 1987

[51] Int. Cl.$^4$ .............................................. F15B 9/10
[52] U.S. Cl. ....................................... 91/371; 91/372; 91/375 A; 180/143
[58] Field of Search ................. 91/375 A, 375 R, 382, 91/370, 371, 372; 74/132; 180/141, 143

[56] References Cited

U.S. PATENT DOCUMENTS

| | | | |
|---|---|---|---|
| 3,998,131 | 12/1976 | Adams | 91/375 A X |
| 4,173,987 | 11/1979 | Kouda | 91/375 A X |
| 4,276,812 | 7/1981 | Dymond | 91/467 |
| 4,373,598 | 2/1983 | Elser | 180/143 |
| 4,429,621 | 2/1984 | Adams | 91/420 |
| 4,561,516 | 12/1985 | Bishop et al. | 180/143 |
| 4,582,086 | 4/1986 | Bacardit | 91/375 A X |
| 4,593,783 | 6/1986 | Honaga et al. | 180/141 |
| 4,606,424 | 8/1986 | Hasegawa | 180/143 |
| 4,621,703 | 11/1986 | Breitweg | 91/375 A X |
| 4,632,204 | 12/1986 | Honaga et al. | 180/142 |
| 4,644,846 | 2/1987 | Kozuka | 91/375 A X |

OTHER PUBLICATIONS

Article "Power Steering System"–Japanese Publication.
U.S. patent application Ser. No. 919,854, filed Oct. 16, 1986, by Nagae and Hattori and entitled "Vehicle Speed Responsive Power Steering Device".

Primary Examiner—Robert E. Garrett
Assistant Examiner—Mark A. Williamson
Attorney, Agent, or Firm—Tarolli, Sundheim & Covell

[57] ABSTRACT

A power steering control valve includes relatively rotatable inner and outer valve members. A power steering resistance control system resists relative rotation between the inner and outer valve members with a force which varies as a function of variations in vehicle speed. The power steering resistance control system includes a force transmitting member which is disposed adjacent to one end of an outer valve member. A spring force is applied against the force transmitting member urging it in a first direction along the axis of rotation of the valve members. Fluid pressure is applied against the opposite side of the force transmitting member to urge it in the opposite direction along the axis of rotation of the valve members. A speed responsive control unit, connected with a fluid return conduit for the power steering valve, is operable to vary the fluid pressure applied against the force transmitting member as a function of variations in vehicle speed. At relatively low vehicle speeds, the fluid pressure force applied against the force transmitting member is relatively large and it is easy to actuate the steering control valve. As vehicle speed increases, the fluid pressure force applied against the force transmitting member decreases and the resistance to actuation of the steering control valve increases.

26 Claims, 5 Drawing Sheets

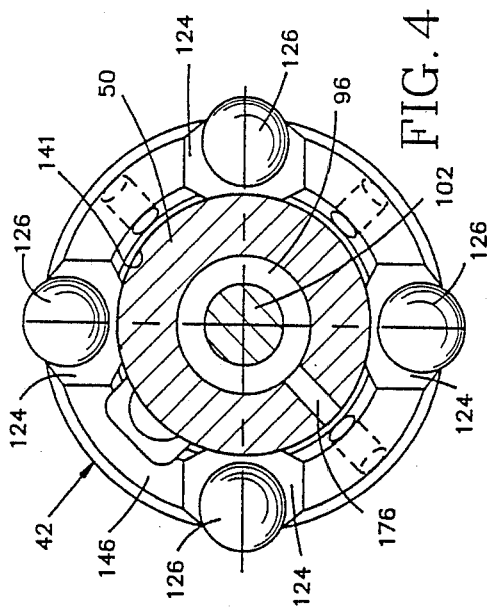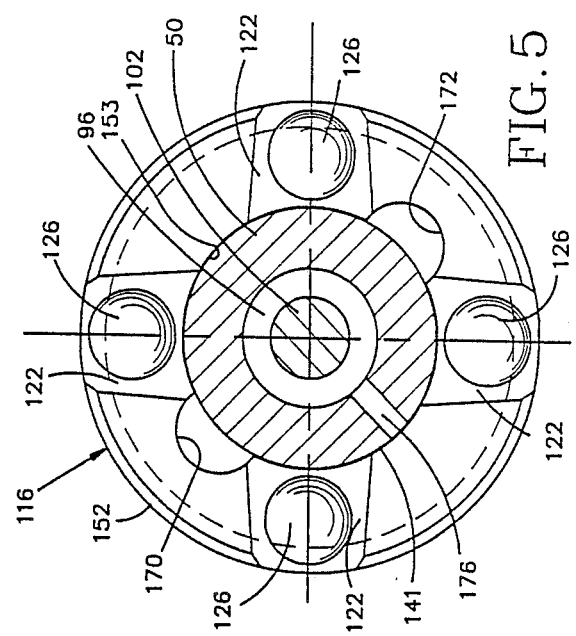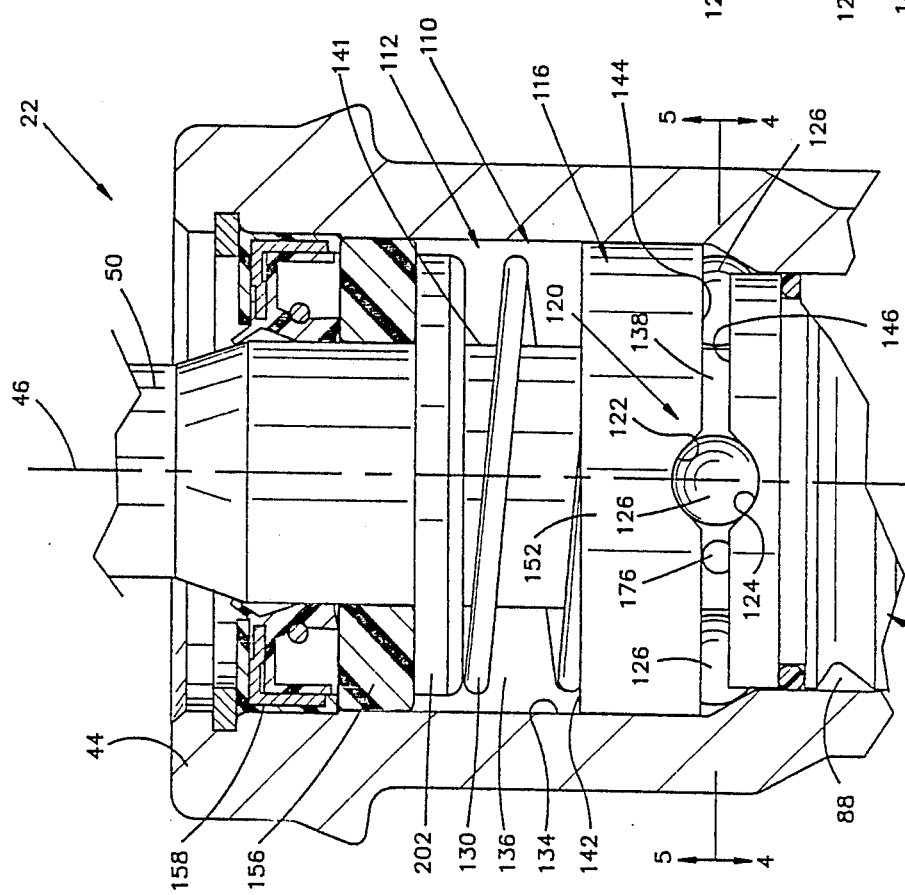

POWER STEERING SYSTEM

BACKGROUND OF THE INVENTION

The present invention relates to a vehicle power steering system and more specifically to a hydraulic vehicle power steering system in which the resistance to actuation of a power steering control valve decreases with decreasing vehicle speed.

A known power steering control valve has a inner valve member which is coaxial with and rotatable relative to an outer valve member or sleeve. To effect actuation of a power steering motor to turn steerable vehicle wheels, the inner valve member is rotated relative to the outer valve member against the influence of a torsion bar. Since actuation of the control valve is resisted by only the torsion bar, the resistance to actuation of the valve does not vary as a function of vehicle speed. The construction of this known power steering control valve is described in U.S. Pat. No. 4,276,812 issued July 7, 1981 and entitled Power Steering Valve and Method of Making the Same.

It is known to increase the resistance felt by an operator of a vehicle to actuation of a power steering system as vehicle speed increases. One known way of accomplishing this is by having the supply of power steering fluid from a pump restricted as vehicle speed increases. However, in such a system, if a quick turn is attempted at high vehicle speeds, the restricted supply of fluid to the power steering motor may prevent the steering system from responding quickly to rapid rotation of the steering wheel.

An alternative means to increase the resistance felt by an operator of a vehicle to actuation of a power steering system is described in U.S. Pat. No. 4,373,598, issued Feb. 15, 1983 and entitled Auxiliary Steering for Motor Vehicles, which has the fluid pressure in a reaction chamber increase as vehicle speed increases. Increasing the fluid pressure in the reaction chamber increases the resistance to relative rotation between a pair of valve members. Power steering control valves in which the fluid pressure in a reaction chamber is increased to increase the resistance to relative movement between valve members are also disclosed in U.S. Pat. No. 4,034,825 issued July 12, 1977 and entitled Power Assisted Vehicle Steering and in U.S. Pat. No. 4,583,610 issued Apr. 22, 1986 and entitled Power Steering Apparatus.

These power steering systems rely on increasing fluid pressure in a reaction chamber to increase the resistance to relative movement between a pair of steering control valve members as vehicle speed increases. If there should be a loss of fluid pressure in the reaction chamber, the power steering control valve would be easily actuated. The resulting reduction in the force required to actuate the power steering control valve could result in excessive steering wheel rotation in the event of a loss of pressure in the reaction chamber at high vehicle speeds.

SUMMARY OF THE INVENTION

The present invention provides a new and improved apparatus for use in a vehicle to control the operation of a power steering motor. The apparatus includes a control valve assembly having a resistance to actuation which increases as vehicle speed increases. A speed responsive control unit is connected in fluid communication with a pressure responsive control unit in the valve assembly by a conduit through which fluid from the power steering motor is returned to a reservoir. The pressure responsive control unit resists relative rotation between inner and outer valve members with a force which increases as vehicle speed increases.

The pressure responsive control unit includes a force transmitting member which is pressed toward the outer valve member by a biasing spring. The force transmitting member provides resistance to relative rotation between inner and outer valve members with a force which increases and tends to move the force transmitting member toward the outer valve member. The force transmitting member is urged away from the outer valve member, against the influence of the biasing spring, by fluid pressure in a chamber disposed between the force transmitting member and one end of the outer valve member. The pressure in the chamber decreases as vehicle speed increases.

The force resisting relative rotation between the inner and outer valve members varies as a function of the difference between the spring force urging the force transmitting member in one direction and the pressure force urging the force transmitting member in the opposite direction. The pressure force increases as vehicle speed decreases. Therefore, the resistance to relative rotation between the valve members decreases with decreasing vehicle speed.

BRIEF DESCRIPTION OF THE DRAWINGS

The foregoing and other features of the present invention will become more apparent to one skilled in the art upon reading the following description with reference to the accompanying drawings wherein:

FIG. 3 is an enlarged fragmentary sectional view of a portion of FIG. 2 and illustrating the construction of a pressure responsive control unit which resists relative rotation between inner and outer valve members with a force which increases as vehicle speed increases;

FIG. 4 is a sectional view, taken generally along the line 4—4 of FIG. 3, illustrating the relationship between a plurality of cam elements or balls and a plurality of cam surfaces formed on one end of an outer valve member;

FIG. 5 is a fragmentary sectional view, taken generally along the line 5—5 of FIG. 3 and with parts omitted illustrating the relationship between the cam elements and cam surfaces formed on a force transmitting member;

DESCRIPTION OF ONE SPECIFIC PREFERRED EMBODIMENT OF THE INVENTION

Power Steering System—General Description

Figure 1:
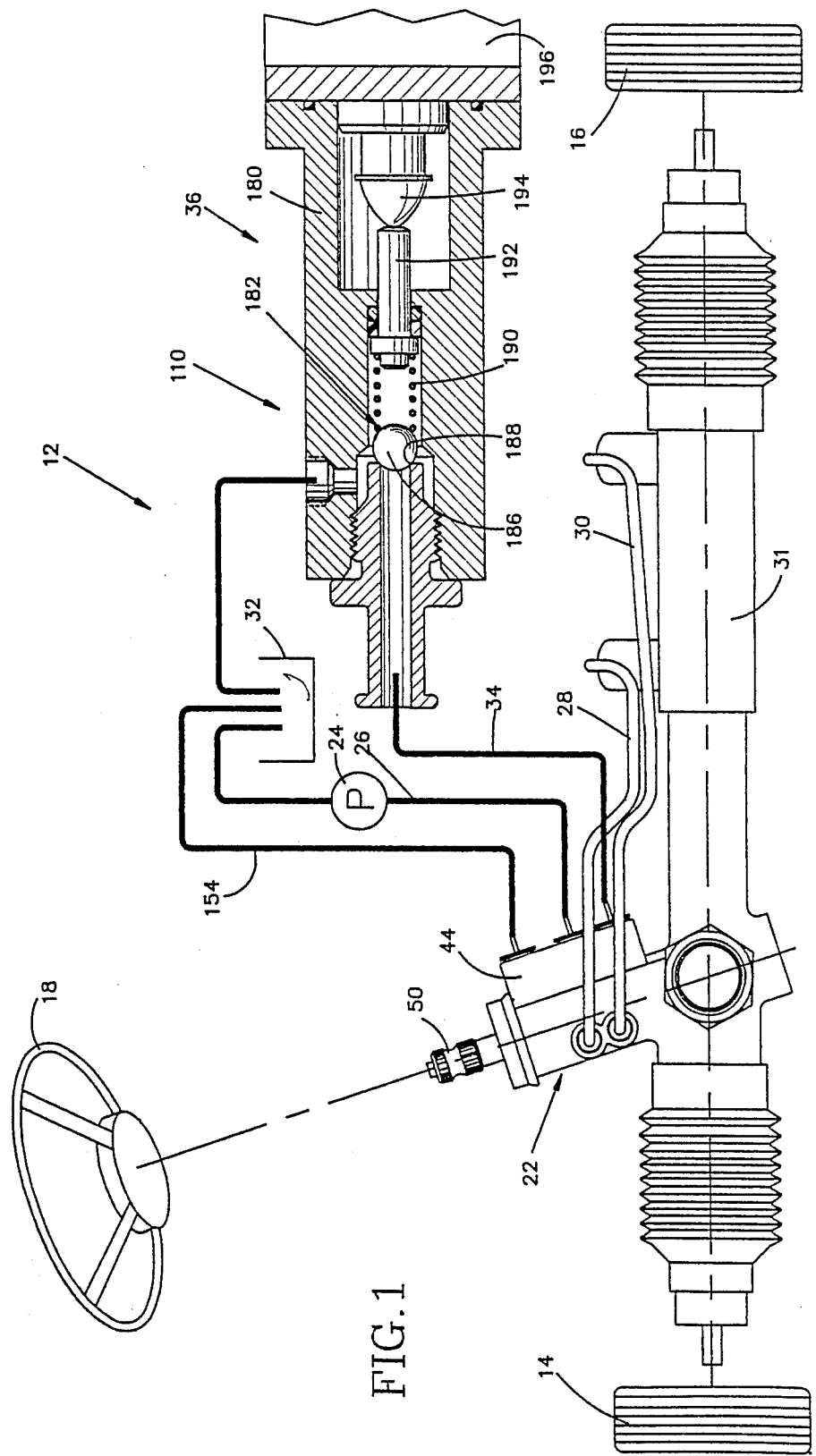
FIG. 1 is a schematic illustration of a vehicle power steering system which is constructed and operated in accordance with the present invention.

A vehicle power steering system 12 (FIG. 1) is operable to turn steerable vehicle wheels 14 and 16 upon rotation of a steering wheel 18 by an operator of the vehicle. Rotation of the steering wheel 18 actuates a power steering control valve 22 to port fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels 14 and 16. Fluid is conducted from the motor 31 to a reservoir 32 through the other one of the motor conduits 28 or 30, the power steering control valve 22, a return conduit 34 and a speed responsive control unit 36.

The power steering control valve 22 (FIG. 2) includes an inner valve member 40 and an outer valve member or sleeve 42. The outer valve member 42 is cylindrical and encloses the inner valve member 40. The inner valve member 40 and outer valve member 42 are rotatable relative to each other and to a housing 44 about a common central axis 46.

The inner valve member 40 is formed as one piece with a cylindrical input member or valve stem 50 which is connected with the steering wheel 18 (FIG. 1). The one piece outer valve member 42 is connected with a follow-up member 54 (FIG. 2) by a pin 56. The follow-up member 54 is rotatably supported in the housing 44 by bearings 58 and 60. The follow-up member 54 also provides a pinion gear 64 which is disposed in meshing engagement with a rack 66. The rack 66 is connected with the power steering motor 31 and steerable vehicle wheels 14 and 16 (FIG. 1).

The power steering control valve 22 (FIG. 2) is of the open center type. Therefore, when the power steering control valve is in an initial or unactuated condition, fluid pressure from the pump 24 is conducted through the motor conduits 28 and 30 to motor cylinder chambers 72 and 74 on opposite sides of a piston 76 in the power steering motor 31. Also, fluid flow from the pump 24 is directed by the power steering control valve 22 to the return conduit 34 and reservoir 32.

Upon rotation of the steering wheel 18 and rotation of the valve stem 50, the inner valve member 40 is rotated about the axis 46 relative to the housing 44 and outer valve member 42. This directs high pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the extent of communication of the motor conduit 28 with the reservoir 32 and increase the extent of communication of the motor conduit 28 with the pump 24. This results in high pressure fluid from the pump 24 being conducted to the motor cylinder chamber 72. This high pressure fluid moves the piston 76 toward the right (as viewed in FIG. 2). As the piston 76 moves toward the right (as viewed in FIG. 2), fluid discharged from the chamber 74 is conducted through the motor conduit 30 to the reservoir 32 through the return conduit 34.

As the power steering motor 31 operates, the rack 66 rotates the pinion 64 and follow-up member 54. This rotates the outer valve member 42 relative to the inner valve member 40. When the power steering motor 31 is operated to turn the steerable vehicle wheels 14 and 16 to an extent corresponding to the extent of rotation of the inner valve member 40, the rack 66 rotates the pinion 64 through a distance sufficient to move the outer valve member 42 to its initial position relative to the inner valve member. When this occurs, the fluid pressure in the motor cylinder chambers 72 and 74 equalizes and the motor 31 stops operating.

When the power steering control valve 22 is in the initial position, fluid pressure from the pump 24 is conducted to an annular central groove 80 (FIG. 2) formed in the outer valve member 42. Fluid flows to the inside of the cylindrical outer valve member 42 through a pair of diametrically opposite passages 82 and 84. The inner valve member 40 has a generally square cross sectional configuration with rounded corners which cooperate with axially extending grooves formed inside the outer valve member 42. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

Figure 8:
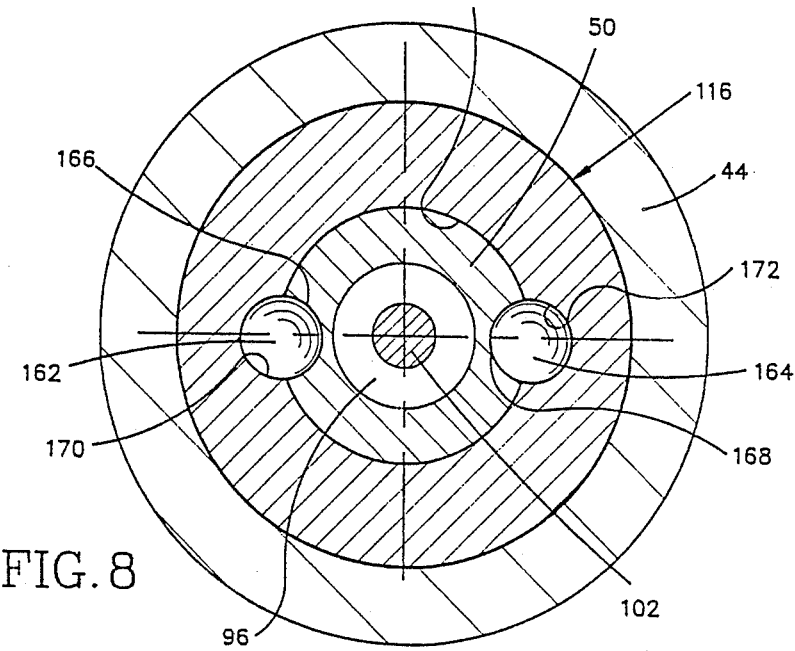
FIG. 8 is a fragmentary sectional view, taken generally along the line 8—8 of FIG. 7, further illustrating the relationship between the retaining elements, force transmitting member, and valve stem.

A pair of diametrically opposite openings 94 extend radially inwardly to an axially extending central passage 96 (FIGS. 4 and 8) in the inner valve member 40. The central passage 96 is connected in fluid communication with a chamber 98 (FIG. 2) at the lower end of the outer valve member 42. The chamber 98 is connected in fluid communication with the reservoir 32 by the return conduit 34.

The inner and outer valve members 40 and 42 are interconnected by a torsion bar 102 (FIGS. 4, 5 and 7) which is disposed in the axially extending return fluid passage 96. One end of the torsion bar 102 is connected to the valve stem 50 and the opposite end of the torsion bar is connected to the follow-up member 54. The torsion bar 102 twists to enable relative rotation between the inner and outer valve members 40 and 42 to occur and when free urges the inner and outer valve members 40 and 42 to their initial positions.

The inner and outer valve members 40 and 42 have the same construction and cooperate with each other and the torsion bar 102 in the same manner as is described in U.S. Pat. No. 4,276,812 issued July 7, 1981 and entitled Power Steering Valve and Method of Making the Same. However, the inner and outer valve members 40 and 42 could have a different construction if desired.

Power Steering Resistance Control System

In accordance with the present invention, a power steering resistance control system 110 (FIG. 1) decreases the force which is required to actuate the power steering control valve 22 as vehicle speed decreases. Thus, at relatively low vehicle speeds, a small force is required to rotate the inner valve member 40 relative to the outer valve member 42. At relatively high vehicle speeds, a larger force is required to rotate the inner valve member 40 relative to the outer valve member 42.

The power steering resistance control system 110 includes two major components, that is, a pressure responsive control unit 112 disposed in the power steering control valve housing 44 (FIGS. 2, 3, 6 and 7) and the speed responsive control unit 36 (FIG. 1).

The pressure responsive control unit 112 includes an annular force transmitting member or slider 116 (FIGS. 2 and 3) which is disposed in the power steering control valve housing 44. The force transmitting member 116 rotates about its central axis 46 with the inner valve member 40 and valve stem 50. Although the force transmitting member 116 rotates with the inner valve member 40 and valve stem 50, the force transmitting member 116 is movable axially along the valve stem 50.

The force transmitting member 116 is connected with the outer valve member 42 by a cam assembly 120 (FIG. 3). The cam assembly 120 includes a plurality of downwardly (as shown in FIG. 3) facing cam surfaces 122 on the force transmitting member 116, a plurality of upwardly (as shown in FIG. 3) facing cam surfaces 124 on the outer valve member 42, and a plurality of balls or spherical cam elements 126. In the illustrated embodiment of the invention, there are four cam elements or balls 126 (FIGS. 4 and 5) disposed between four pairs of cam surfaces 122 and 124 formed on the force transmitting member 116 (FIG. 5) and outer valve member 42 (FIG. 4). However, a greater or lesser number of cam elements 126 and cam surfaces 122 and 124 could be used if desired.

The force transmitting member 116 is urged axially toward the outer valve member 42 by a coil spring 130 which is disposed in a coaxial relationship with and circumscribes the valve stem 50. The downward force applied against the force transmitting member 116 by the coil spring 130 presses the cam surfaces 122 and 124 against opposite sides of the balls 126. The downward force applied against the balls 126 by the force transmitting member 116 centers the balls on the cam surfaces 122 and 124.

The annular force transmitting member 116 cooperates with a cylindrical inner side surface 134 of the housing 44 and the valve stem 50 to form a pair of annular chambers 136 and 138 on axially opposite sides of the force transmitting member 116. An annular upper side 142 of the force transmitting member 116 cooperates with the cylindrical inner side surface 134 of the housing 44 and the cylindrical outer side surface 141 of the valve stem 50 to partially define the spring chamber 136. Similarly, an annular lower side 144 of the force transmitting member 116 cooperates with the inner side surface 134 of the housing 44 and the outer side surface 141 of the valve stem 50 to partially define an annular pressure chamber 138.

The fluid pressure in the chamber 138 urges the force transmitting member 116 away from the cam elements or balls 126, in opposition to the spring 130. It should be understood that the force applied by the spring 130 against the annular side 142 of the force transmitting member 116 is always greater than the fluid pressure force applied against the annular side 144 of the force transmitting member. Therefore, the cam surfaces 122 on the force transmitting member 116 always remain in abutting engagement with the balls or cam elements 126.

Figure 2:
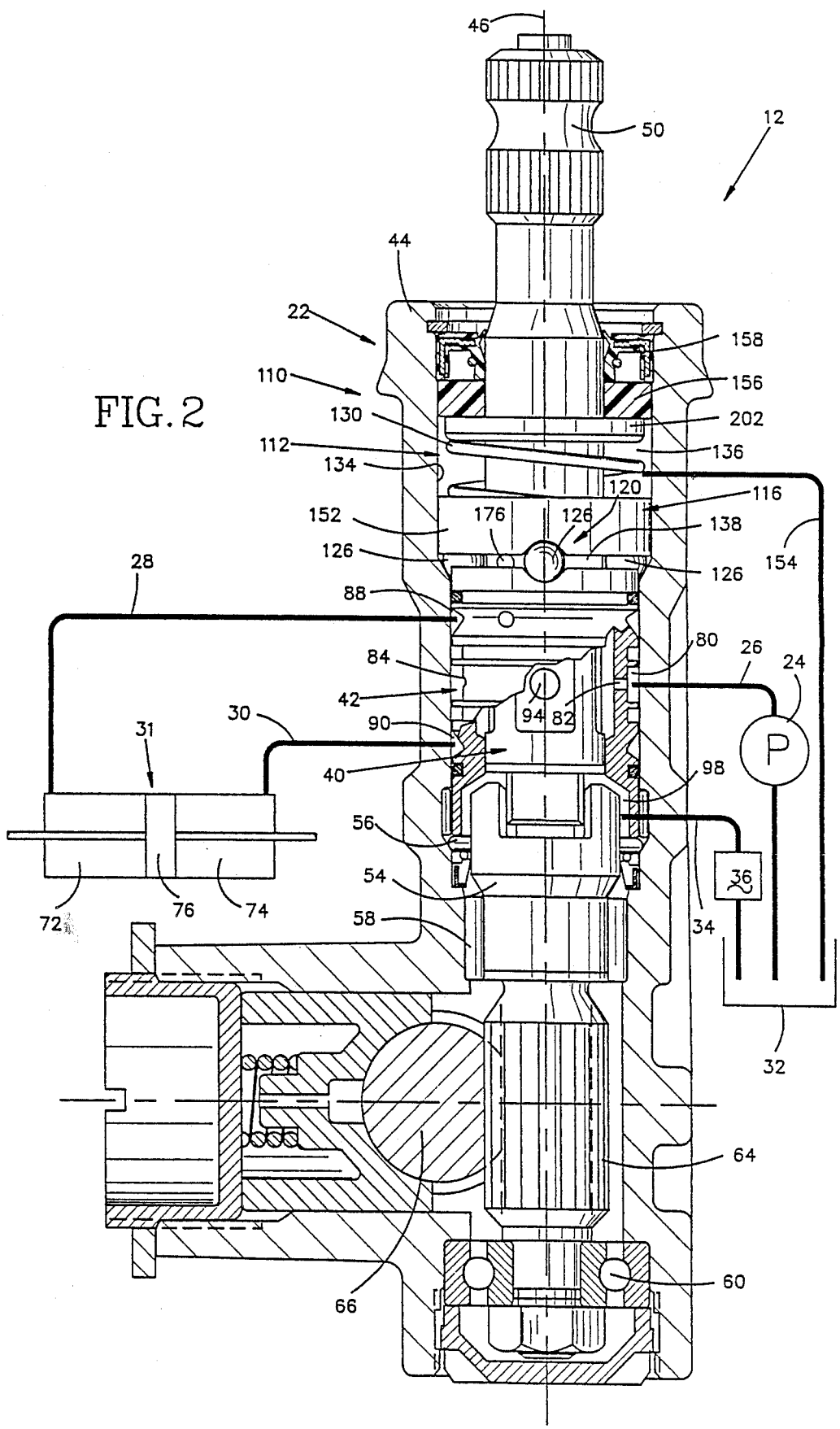
FIG. 2 is an enlarged sectional view of a power steering control valve used in the power steering system of FIG. 1.

There is a noninterference fit between a cylindrical outer side surface 152 of the force transmitting member 116 and the inner side surface 134 of the housing 44. There is also a fluid sealing, noninterference, fit between a cylindrical inner side surface 153 (FIG. 5) of the force transmitting member 116 and the outer side surface 141 of the valve stem. It is contemplated that some fluid will leak from the pressure chamber 138 (FIG. 3) into the spring chamber 136. Therefore, the spring chamber 136 is connected with the reservoir 32 through a drain conduit 154 (FIG. 2). The upper end of the valve housing 44 is sealed by an annular seal ring 158 (FIG. 3) which engages the inner side surface 134 of the housing and the outer side surface of the valve stem 50. A second annular seal ring 158 is provided to further ensure a fluid tight seal.

Rotation of the valve stem 50 and inner valve member 40 relative to the housing 44 and outer valve member 42 is resisted by the pressure responsive control unit 112 with a force which is a function of the difference between the fluid pressure force applied to the side 144 of the force transmitting member 116 and the spring force applied against the side 142 of the force transmitting member. As the valve stem 50 is rotated from the initial position shown in FIG. 3 toward a fully actuated position shown in FIG. 6, the outer side surfaces of the cam elements or balls 126 roll on the cam surfaces 122 and 124 as the force transmitting member 116 is rotated about the axis 46. As this occurs, the force transmitting member is moved from the position shown in FIG. 3 toward the position shown in FIG. 6 against the influence of the biasing spring 130. As the side 144 of the force transmitting member 116 moves away from an annular upper end 146 of the outer valve member 42, the size of the pressure chamber 138 is increased and the size of the spring chamber 136 is decreased.

The force required to roll the spherical force transmitting elements 126 on the cam surfaces 122 and 124 and to move the force transmitting member 116 away from the end 146 of the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 from the initial position of FIG. 3. The net force pressing the force transmitting member 116 against the cam elements 126 is equal to the difference between the force applied by the spring 130 against the side 142 of the force transmitting member 116 and the fluid pressure force applied by the fluid in the chamber 138 against the side 144 of the force transmitting member. The greater the fluid pressure force applied against the side 144 of the force transmitting member 116, the smaller is the force which must be overcome to rotate the valve stem 50 and force transmitting member 116 relative to the outer valve member 42.

Figure 7:
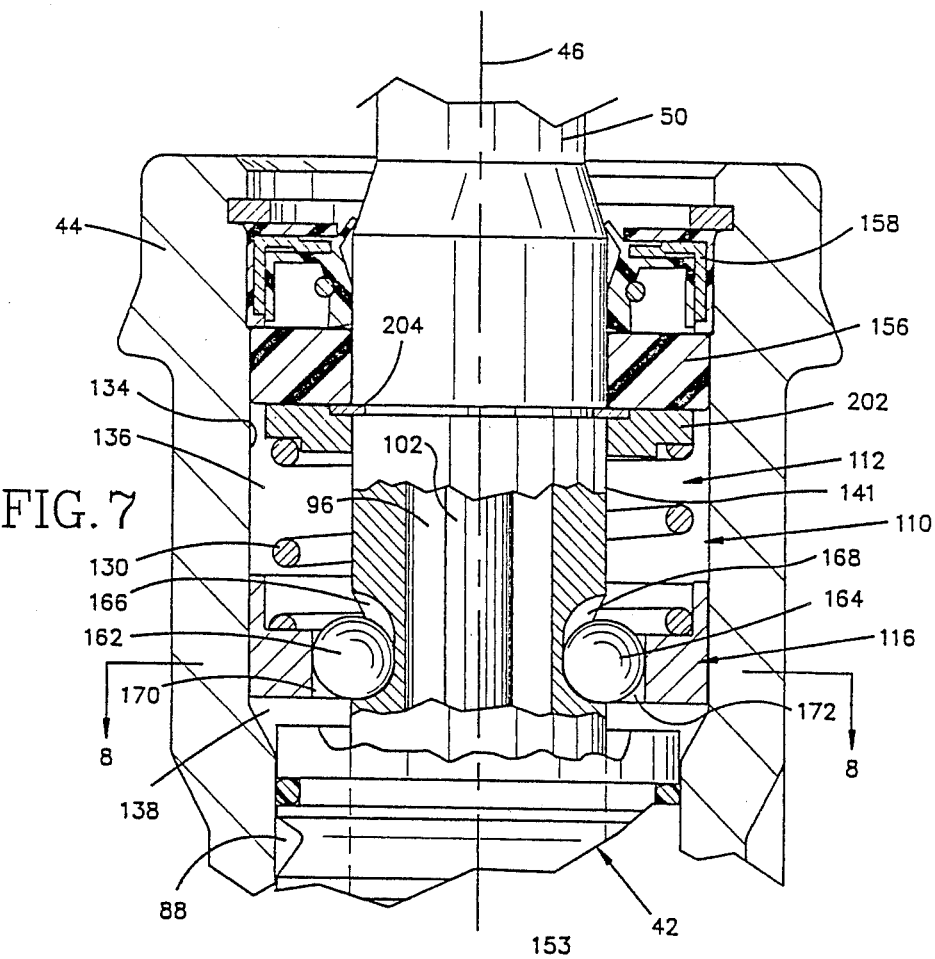
FIG. 7 is a fragmentary sectional view illustrating the relationship between the force transmitting member, a valve stem, and a plurality of retaining elements which prevent relative rotation between the valve stem and force transmitting member.

A pair of retaining elements or balls 162 and 164 (FIGS. 7 and 8) interconnect the force transmitting member 116 and the valve stem 50 to hold the force transmitting member against rotation relative to the valve stem while allowing the force transmitting member 116 to move axially relative to the valve stem 50. The spherical retaining elements 162 and 164 engage a pair of diametrically opposite grooves 166 and 168 formed in the valve stem 50 and a pair of axially extending grooves 170 and 172 formed in the force transmitting member 116. When the power steering control valve 22 is in the initial position illustrated in FIG. 7, the force transmitting member 116 is close to the end of the outer valve member 42. At this time, the retaining elements 162 and 164 are disposed adjacent to the ends of the grooves 166 and 168 in the valve stem 50 (FIG. 7).

Figure 6:
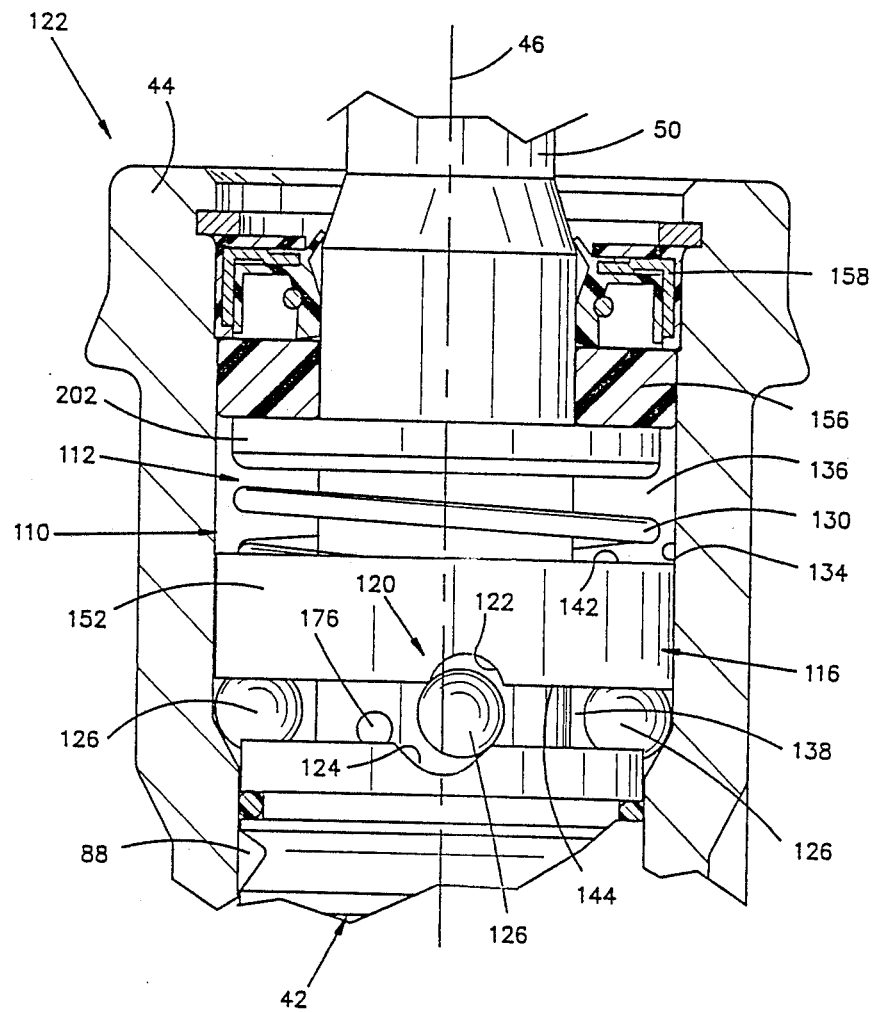
FIG. 6 is a fragmentary sectional view, generally similar to FIG. 3, illustrating the relationship between the force transmitting member, cam elements, and outer valve member when the inner valve member has been rotated relative to the outer valve member.

Upon rotation of the valve stem 50 to actuate the power steering control valve 22, the force transmitting member 116 is cammed from the position shown in FIG. 3 toward the position shown in FIG. 6. During this movement of the force transmitting member 116, the retaining elements 162 and 164 transmit torque from the valve stem 50 to the force transmitting member 116 to rotate the force transmitting member relative to the housing 44 and stationary outer valve member 42. As this occurs, the spherical retaining elements 162 and 164 roll upwardly in the grooves 166 and 168 formed in the valve stem 50.

There is a relatively tight, noninterference, fit between the retaining elements 162 and 164 and the grooves 166, 168, 170 and 172 formed in the valve stem 50 and force transmitting member 116 to retard the leakage of fluid from the pressure chamber 138 to the valve spring chamber 136 along the valve stem 50. Any such fluid which does leak into the valve spring chamber 136 is conducted back to the reservoir through the conduit 154 (FIG. 2). Although it is preferred to use spherical balls 162 and 164 as retaining elements, other types of connections could be used.

As noted above, the power steering resistance control system 110 includes the speed responsive control unit 36 (FIG. 1). The speed responsive control unit 36 is operable to vary the fluid pressure in the chamber 138 (FIGS. 2, 3 and 6) of the pressure responsive control unit 112 with changes in vehicle speed. The speed responsive control unit 36 is connected in fluid communication with the chamber 138 of the pressure responsive control unit 112 by the return conduit 34 (FIGS. 1 and 2), the axially extending passage 96 in the valve stem 50 (FIG. 7), and a radially extending passage 176 in the valve stem (FIGS. 3-6).

The speed responsive control unit 36 includes a housing 180 which is connected in series with the return conduit 34 (FIG. 1). A back pressure control valve 182 in the housing 180 is operable to vary the fluid pressure in the portion of the return conduit between the speed responsive control unit housing 180 and the steering control valve 22. The back pressure control valve 182 includes a spherical ball or valve element 186 which is urged toward a circular valve seat 188 by a spring 190. A plunger 192 is movable in the housing 180 to vary the force applied against the ball or valve element 186 by the spring 190. The plunger 192 is moved by the output shaft 194 of a linear actuator 196.

Movement of the output shaft 194 of the linear actuator 196 and the plunger 192 relative to the housing 180 varies the force with which a spring 190 presses the ball 186 against the valve seat 188. When the plunger 192 is in the retracted position shown in FIG. 1, the valve spring 190 is relaxed and applies a relatively small biasing force against the valve element 186. Therefore, a relatively low fluid pressure in the return conduit 34 upstream from the speed responsive control unit 36 is effective to unseat the ball 186 and allow fluid to flow to the reservoir 32. At this time, there is a relatively low fluid pressure conducted to the the fluid pressure chamber 138 (FIGS. 2 and 3) from the return conduit 34 through the valve stem passages 96 and 176 (FIGS. 3 and 4).

When the output shaft 194 of the linear actuator 196 is extended, the plunger 192 is moved to the left (as viewed in FIG. 1). This movement of the plunger 192 compresses the valve spring 190 to increase the biasing force applied against the valve element 186. Therefore, the fluid pressure in the return conduit 34 upstream of the speed responsive control unit 36 increases. This increased fluid pressure is transmitted to the pressure chamber 138 (FIGS. 2 and 3) in the pressure responsive control unit 112.

The output shaft 194 of the linear actuator 196 positions the plunger 192 as a function of vehicle speed. The linear actuator 196 is connected to a transducer in the vehicle transmission and receives a signal which varies as a function of vehicle speed. At relatively low vehicle speeds, the linear actuator output shaft 194 is fully extended so that the plunger 192 compresses the valve spring 190 to a maximum extent. Therefore, at relatively low vehicle speeds, there is a relatively high fluid pressure in the portion of the return conduit 34 upstream of the speed responsive control unit 36 and in the pressure chamber 138.

At relatively high vehicle speeds, the output shaft 194 of the linear actuator 196 is retracted. At this time, the coil spring 190 applies a relatively small biasing force against the valve element 186. This results in a relatively low fluid pressure in the portion of the return conduit 34 upstream of the speed responsive control unit 36 and in the pressure chamber 138. The linear actuator 196 is commercially available from Airpax, Cheshire Division, Cheshire, Conn., U.S.A. and is a model K92121-P2. Of course, other known linear actuators could be used if desired.

The force which is required to actuate the power steering control valve 22 will vary as a function of the fluid pressure in the chamber 138. Thus, the greater the pressure in the chamber 138, the greater is the fluid pressure force urging the force transmitting member 116 upwardly (as viewed in FIG. 2) against the influence of the biasing spring 130. The greater the force urging the force transmitting member 116 against the biasing spring 130, the smaller is the force required to rotate the valve stem 50 from the unactuated position of FIG. 3.

At relatively low vehicle speeds, the output shaft 194 (FIG. 1) of the linear actuator 196 is fully extended. At this time, a relatively high fluid pressure is present in the portion of the return conduit 34 upstream of the speed responsive control unit 36. This relatively high fluid pressure is communicated from the lower ends (as viewed in FIG. 2) of the valve members 40 and 42 through the valve stem passage 96 (FIG. 7) and the radially extending passage 176 (FIGS. 3-6) to the pressure chamber 138. At low vehicle speeds, the relatively high fluid pressure in the chamber 138 urges the force transmitting member 116 against the biasing spring 130.

Upon rotation of the steering wheel 18 and valve stem 50, the cam elements 126 exert a force on the force transmitting member 116. This force is added to the fluid pressure force in the chamber 138 to move the force transmitting member 116 from the initial position of FIG. 3. As this occurs, the spring 130 is compressed against a collar 202 (FIG. 7) which is held against axial movement relative to the valve stem 50 by a retaining ring 204.

The actuated power steering control valve 22 ports fluid from the pump 24 to the power steering motor 31 to move the rack 66 and steerable vehicle wheels 14 and 16 (FIG. 1). As the vehicle wheels 14 and 16 are turned, the rack 66 (FIG. 2) rotates the pinion 64. This in turn rotates the outer valve member 42. When the vehicle wheels 14 and 16 have been turned to an extent corresponding to the extent of rotation of the steering wheel 18 and the valve stem 50, the outer valve member 42 will have been rotated back to its initial position relative to the inner valve member 40 to interrupt operation of the power steering motor 31. At this time, the outer valve member 42 will also be in its initial position (FIG. 3) relative to the force transmitting member 116.

When the vehicle is traveling at a relatively high speed, the linear actuator output shaft 194 is retracted. Therefore, the plunger 192 is retracted and the spring 190 is relaxed. Thus, relatively low fluid pressure exists in the portion of the return conduit 34 upstream from the speed responsive control unit 36.

This relatively low fluid pressure in the return conduit 34 is conducted through the axially extending passage 96 and the radially extending passage 176 in the valve stem 50 to the pressure chamber 138. Since the pressure in the chamber 138 is relatively low at high vehicle speeds, there is a relatively small fluid pressure force to offset the force of the spring 130. Therefore, substantial resistance is encountered in rotating the valve stem 50 and inner valve member 40 (FIG. 2) relative to the outer valve member 42.

It should be understood from the above that the power steering resistance control system 110 is constructed so that it can be used in association with known power steering control valve structures with a minimum of modifications and without impeding the ability of a power steering system to be quickly operated at high vehicle speeds. Thus, the power steering resistance control system 110 can be used in association with the power steering control valve described in the aforementioned U.S. Pat. No. 4,276,812 with a minimum of modification to the power steering control valve. In addition, the power steering resistance control system 110 does not interfere with the supplying of fluid from the pump 24 to the power steering motor 32. This enables the power steering control system 12 to be quickly actuated to rapidly maneuver a vehicle at relatively high speeds.

Having described a specific preferred embodiment of the invention the following is claimed:

1. An apparatus comprising:
    first and second valve members which are relatively movable to port fluid to a vehicle power steering motor; and
    force transmitting means for resisting relative movement between said first and second valve members with a force which varies as a function of vehicle speed, said force transmitting means including:
        a force transmitting member connected with said first valve member and movable toward and away from said second valve member,
        means for increasing the resistance to relative movement between said first and said second valve members as said force transmitting member moves toward said second valve member,
        means for applying to said force transmitting member a force which urges said force transmitting member away from said second valve member to reduce the resistance to relative movement between said first and second valve members, and
        means for decreasing said force as vehicle speed increases to increase the resistance to relative movement between said first and second valve members as vehicle speed increases.

2. An apparatus as set forth in claim 1 further including first conduit means for conducting fluid from a source of fluid to said first and second valve members, second conduit means for conducting fluid between said first and second valve members and the vehicle power steering motor, and third conduit means for conducting fluid from said first and second valve members to a reservoir, said means for decreasing said force with increase in vehicle speed including means for decreasing the fluid pressure in at least a portion of said third conduit means as vehicle speed increases.

3. An apparatus as set forth in claim 1 wherein said means for applying to said force transmitting member a force which urges said force transmitting member away from said second valve member includes means defining a fluid pressure chamber disposed between said second valve member and said force transmitting member, and said means for decreasing said force with increase in vehicle speed comprising means for decreasing the fluid pressure in said fluid pressure chamber as vehicle speed increases.

4. An apparatus as set forth in claim 1 further including supply conduit means for conducting fluid from a source of fluid to said first and second valve members, first motor conduit means for conducting fluid from said first and second valve members to the vehicle power steering motor when said first and second valve members have been moved to a first operated condition and for conducting fluid from the vehicle power steering motor to said first and second valve members when said first and second valve members have been moved to a second operated condition, second motor conduit means for conducting fluid from said first and second valve members to the vehicle power steering motor when said first and second valve members have been moved to the second operated condition and for conducting fluid from the vehicle power steering motor to said first and second valve members when said first and second valve members have been moved to the first operated condition, return conduit means for conducting fluid from said first and second valve members to a reservoir, said means for applying to said force transmitting member a force which urges said force transmitting member away from said second valve member comprising pressure responsive means connected in fluid communication with said return conduit means, and said means for decreasing said force with increase in vehicle speed including speed responsive means connected with said return conduit means between said first and second valve members and the reservoir for decreasing the fluid pressure in at least a portion of said return conduit means as vehicle speed increases to decrease the fluid pressure in said pressure responsive means to thereby decrease said force.

5. An apparatus as set forth in claim 1 wherein said first and second valve members are rotatable relative to each other about a common central axis, said force transmitting member being movable along the central axis of said first and second valve members to vary the resistance to relative movement between said first and second valve members.

6. An apparatus as set forth in claim 1 wherein said force transmitting member includes a first surface area connected with said first valve member, and said force transmitting means further includes a second surface area connected with said second valve member, and a member disposed between and in abutting engagement with said first and second surface areas.

7. An apparatus as set forth in claim 1 wherein said force transmitting member includes surface means for defining an opening, said apparatus further including a valve stem which extends through said opening in said force transmitting member and is connected with said first valve member, said force transmitting member being movable along said valve stem in directions toward and away from said second valve member.

8. An apparatus as set forth in claim 1 further including spring means for applying to said force transmitting member a force which urges said force transmitting member toward said second valve member.

9. An apparatus for use in a vehicle to control the flow of fluid to a power steering motor, said apparatus comprising:
a rotatable inner valve member,
a rotatable outer valve member disposed in a coaxial relationship with and at least partially enclosing said inner valve member,
means for effecting relative rotation between said valve members to regulate fluid flow to the power steering motor,
force transmitting means for resisting relative rotation between said inner and outer valve members with a force which varies as a function of vehicle speed, said force transmitting means including;
a force transmitting member disposed adjacent to one end of said outer valve member and movable toward and away from said outer valve member along the axis of rotation of said inner and outer valve members,
connector means for connecting said force transmitting member with said inner valve member for rotation therewith relative to said outer valve member,
first means for applying a first force against a first side of said force transmitting member to urge said force transmitting member in a first direction along the axis of rotation of said inner and outer valve members,
second means for applying a second force against a second side of said force transmitting member to urge said force transmitting member in a second direction along the axis of rotation of said inner and outer valve members,
means for varying the second force as a function of variations in vehicle speed, and
means connected with said outer valve member and said force transmitting member for resisting relative rotation between said inner and outer valve members with a force which is a function of the difference between said first and second forces.

10. An apparatus as set forth in claim 9 wherein said first means includes a spring which urges said force transmitting member toward said one end of said outer valve member with the first force.

11. An apparatus as set forth in claim 9 further including a housing at least partially enclosing said first and second valve members, said force transmitting member cooperating with said housing to at least partially define a chamber for holding fluid, said means for varying the second force as a function of variations in vehicle speed including means for varying the fluid pressure in said chamber as function of variations in vehicle speed.

12. An apparatus as set forth in claim 11 wherein said first means for applying force against said force transmitting member includes a spring disposed on a side of said force transmitting member opposite from said chamber.

13. An apparatus as set forth in claim 9 wherein said second means includes means for urging said force transmitting member away from said one end of said outer valve member.

14. An apparatus as set forth in claim 9 wherein said means connected with said outer valve member and said force transmitting member for resisting relative rotation between said inner and outer valve members includes a first surface connected to said force transmitting member, a second surface connected to said outer valve member, and an intermediate member disposed in abutting engagement with said first and second surfaces, said first and second surfaces being pressed against said intermediate member with a force which is a function of the difference between said first and second forces.

15. An apparatus as set forth in claim 9 wherein said force transmitting member includes surface means for defining a central opening, said means for effecting relative rotation between said valve members includes a valve stem which extends through the opening in said force transmitting member and is connected with said inner valve member, said connector means including means for retaining said force transmitting member against rotation relative to said valve stem and for enabling said force transmitting member to move axially along said valve stem.

16. An apparatus as set forth in claim 9 further including first conduit means for conducting fluid from a source of fluid to said valve members, second conduit means for conducting fluid between said valve members and the power steering motor and third conduit means for conducting fluid from the valve members to a reservoir, said means for varying the second force as a function of variations in vehicle speed including means for varying the fluid pressure in at least a portion of said third conduit means as a function of variations in vehicle speed.

17. An apparatus comprising:
a rotatable inner valve member,
a rotatable valve stem connected with said inner valve member,
a rotatable outer valve member at least partially enclosing said inner valve member, said inner valve member, valve stem and outer valve member being rotatable about a common central axis,
a housing at least partially enclosing said inner and outer valve members,
an annular force transmitting member disposed in said housing adjacent to one end of said inner valve member, said valve stem extending through a central opening in said force transmitting member, said force transmitting member being axially movable toward and away from said outer valve member along said valve stem,
spring means disposed in said housing for applying a first force against a first side of said force transmitting member to urge said force transmitting member toward the one end of said outer valve member,
surface means connected with said force transmitting member, housing and outer valve member to at least partially define a pressure chamber for holding fluid pressure which urges said force transmitting member away from the one end of said outer valve member with a second force, and
means connected with said inner and outer valve members for resisting relative rotation between said inner and outer valve members with a force which is a function of the difference between said first and second forces.

18. An apparatus as set forth in claim 17 wherein said means connected with said inner and outer valve members for resisting relative rotation between said inner and outer valve members includes a first cam surface connected with said force transmitting member, a second cam surface connected with said outer valve member, and a spherical member disposed in abutting engagement with said first and second cam surfaces, said first and second cam surfaces being pressed against said spherical member with a force which is function of the difference between said first and second forces.

19. An apparatus as set forth in claim 17 further including means for connecting said force transmitting member with said valve stem for rotation therewith.

20. An apparatus as set forth in claim 17 further including first conduit means for conducting fluid from a source of fluid to said inner and outer valve members, second conduit means for conducting fluid from said inner and outer valve members when said inner and outer valve members have been rotated to a first operated condition and for conducting fluid to said inner and outer valve members when said inner and outer valve members have been rotated to a second operated condition, third conduit means for conducting fluid from said inner and outer valve members when said inner and outer valve member have been rotated to the second operated condition and for conducting fluid to said inner and outer valve members when said inner and outer valve members have been rotated to the first operated condition, fourth conduit means for conducting fluid from said inner and outer valve members to a reservoir, means connected with said fourth conduit means between said inner and outer valve members and the reservoir for varying the fluid pressure in at least a portion of said fourth conduit means, and fifth conduit means connected in fluid communication with said fourth conduit means and said pressure chamber for transmitting variations in fluid pressure in said fourth conduit means to said pressure chamber.

21. An apparatus for use in a vehicle to control the operation of a power steering motor, said apparatus comprising:
valve means operable from an initial condition to a first actuated condition to effect operation of the power steering motor in a first direction and operable from the initial condition to a second actuated condition to effect operation of the power steering motor in a second direction, said valve means including a rotatable inner valve member and a rotatable outer valve member disposed in coaxial relationship with and at least partially enclosing said inner valve member;
supply conduit means for conducting fluid from a source of fluid to said valve means;
first motor conduit means for conducting fluid from said valve means to the power steering motor when said valve means is in the first actuated condition and for conducting fluid from the power steering motor to said valve means when said valve means is in the second actuated condition;
second motor conduit means for conducting fluid from said valve means to the power steering motor when said valve means is in the second actuated condition and for conducting fluid from the power steering motor to said valve means when said valve means is in the first actuated condition;
return conduit means for conducting fluid from said valve means to a reservoir;
control means for increasing the force required to operate said valve means from the initial condition to said first and second actuated conditions as vehicle speed increases, said control means including:
speed responsive means connected with said return conduit means between said valve means and the reservoir for varying the fluid pressure in at least a portion of said return conduit means as vehicle speed increases, and
pressure responsive means connected in fluid communication with said return conduit means for varying the force required to operate said valve means from the initial condition in response to variations in the fluid pressure in said return conduit means; and
means for effecting relative rotation between said inner and outer valve member to regulate fluid flow to and from said first and second motor conduit means;
said pressure responsive means including a force transmitting member movable along the axis of rotation of said inner and outer valve members, connector means for connecting said force transmitting member with said inner valve member for rotation therewith relative to said outer valve member, first means for applying a first force against a first side of said force transmitting member to urge said force transmitting member in a first direction along the axis of rotation of said inner and outer valve members, second means connected in fluid communication with said return conduit means for receiving fluid pressure transmitted from said return conduit means to apply a fluid pressure force against a second side of said force transmitting member to urge said force transmitting member in a second direction along the axis of rotation of said inner and outer valve members, and means for resisting relative rotation between said inner and outer valve members with a force which is a function of the difference between the first force and the fluid pressure force.

22. An apparatus as set forth in claim 21 wherein said first means includes a spring which urges said force transmitting member toward one end of said outer valve member with the first force.

23. An apparatus as set forth in claim 21 wherein said force transmitting member is disposed adjacent to one end of said outer valve member and is movable toward and away from said outer valve member along the axis of rotation of said inner and outer valve members.

24. An apparatus for use in a vehicle to control the operation of a power steering motor, said apparatus comprising:
valve means operable from an initial condition to a first actuated condition to effect operation of the power steering motor in a first direction and operable from the initial condition to a second actuated condition to effect operation of the power steering motor in a second direction;
supply conduit means for conducting fluid from a source of fluid to said valve means;
first motor conduit means for conducting fluid from said valve means to the power steering motor when said valve means is in the first actuated condition and for conducting fluid from the power steering motor to said valve means when said valve means is in the second actuated condition;

second motor conduit means for conducting fluid from said valve means to the power steering motor when said valve means is in the second actuated condition and for conducting fluid from the power steering motor to said valve means when said valve means is in the first actuated condition, said valve means including first and second valve members which are relatively movable to port fluid to and from said first and second motor conduit means;

return conduit means for conducting fluid from said valve means to a reservoir;

control means for increasing the force required to operate said valve means from the initial condition to said first and second actuated conditions as vehicle speed increases, said control means including:

speed responsive means connected with said return conduit means between said valve means and the reservoir for varying the fluid pressure in at least a portion of said return conduit means as vehicle speed increases, and pressure responsive means connected in fluid communication with said return conduit means for varying the force required to operate said valve means from the initial condition in response to variations in the fluid pressure in said return conduit means, said pressure responsive means including a force transmitting member connected with said first valve member and movable toward and away from said second valve member, means for increasing resistance to relative movement between said first and second valve members as said force transmitting member moves toward said second valve member, and means connected in fluid communication with said return conduit means for holding fluid pressure transmitted from said return conduit means to apply a fluid pressure force against said force transmitting member to urge said force transmitting member away from said second valve member.

25. An apparatus as set forth in claim 2 wherein said fluid pressure decreasing means includes valve means for restricting fluid flow through said third conduit and speed sensor means for sensing variations in vehicle speed and for operating said valve means in accordance with the vehicle speed.

26. An apparatus as set forth in claim 24 wherein said speed responsive means is operable to decrease the fluid pressure in at least a portion of said return conduit means as vehicle speed increases to thereby decrease fluid pressure in said means for holding fluid pressure whereby the force which urges said force transmitting member away from said second valve member decreases.

* * * * *